United States Patent [19]

Nakamura et al.

[11] 4,449,098
[45] May 15, 1984

[54] ARRANGEMENT FOR DETECTING THE LOCATION OF AN ELECTRICALLY INSULATIVE CONTINUOUS ITEM POSITIONED UNDERGROUND

[75] Inventors: Syuichi Nakamura; Masakazu Morioka, both of Osaka, Japan

[73] Assignee: Osaka Gas Company Limited, Osaka, Japan

[21] Appl. No.: 242,255

[22] Filed: Mar. 10, 1981

[30] Foreign Application Priority Data

Mar. 19, 1980 [JP] Japan .................................. 55-35611

[51] Int. Cl.³ ............................ G01V 3/30; H01B 7/28
[52] U.S. Cl. .................................... 324/326; 138/104; 174/102 SC; 405/157
[58] Field of Search ................... 174/102 SC, 120 SC; 138/104; 324/67, 326; 340/539, 540, 605; 405/157, 160, 175

[56] References Cited

U.S. PATENT DOCUMENTS

| Re. 30,393 | 9/1980 | Sherlock | 174/47 X |
|---|---|---|---|
| 1,938,308 | 12/1933 | Wiegand | 174/102 SC |
| 2,597,741 | 5/1952 | Macey | 174/102 SC |
| 3,096,210 | 7/1963 | Boomstra | 174/120 SC |
| 3,564,526 | 2/1971 | Butts | 340/605 X |
| 3,666,876 | 5/1972 | Forster | 174/102 SC X |
| 3,749,817 | 7/1973 | Shiga et al. | 174/102 SC |
| 3,793,476 | 2/1974 | Misiura et al. | 174/102 SC |
| 3,925,597 | 12/1975 | Misiura et al. | 174/102 SC |
| 3,962,531 | 6/1976 | Lever et al. | 174/120 SC X |
| 3,975,735 | 8/1976 | McCullough et al. | 324/67 X |
| 4,051,298 | 9/1977 | Misiura et al. | 174/120 SC X |
| 4,112,417 | 9/1978 | Himeno | 340/605 |
| 4,206,632 | 6/1980 | Suzuki | 340/605 |
| 4,383,133 | 5/1983 | Lanfranconi | 174/120 SC |

FOREIGN PATENT DOCUMENTS 1064622 4/1967 United Kingdom ......... 174/102 SC
612102 5/1978 U.S.S.R. .............................. 340/605

OTHER PUBLICATIONS

Habgood, B. J.; Electrically Conducting Neoprene and Rubber; Transactions, I.R.I.; Jun. 3, 1941; pp. 50–64.
Paul Potter, Jr., "Design and Operating Considerations for Locating Plastic Gas Pipe Systems," Proceedings, Fourth A.G.A. Plastic Pipe Symposium, American Gas Association, pp. 983–994, Nov. 14, 1972.
Southern California Gas Company, "Polyethylene Plastic Pipe–Direct Burial of Mains and Services," Company Job Instructions, pp. 16, 19, Oct. 1, 1972.
"Locating Wire on Service Riser," ibid. p. 1, Dec. 17, 1973.
Locating Wire–Installation," ibid. pp. 1–4, Nov. 1, 1976.

Primary Examiner—J. V. Truhe
Assistant Examiner—Morris H. Nimmo
Attorney, Agent, or Firm—Wenderoth, Lind & Ponack

[57] ABSTRACT

An arrangement for detecting an underground continuous length item includes an electrically conductive wire constituted by covering a flexible metallic core wire with an outer coating layer made of a flexible and electrically conductive high polymeric organic material. The electrically conductive wire is positioned under the ground along the underground continuous length item and is supplied with a high frequency current. Electromagnetic waves are emitted from the wire therefrom for detecting the location of the underground continuous length item located underground. Since electric current is propagated through the ground via the coating layer of the wire upon supply of high frequency power to the wire, whereby it becomes possible to detect from the ground surface the location of the continuous length item located underground in the case where the wire is cut.

2 Claims, 6 Drawing Figures

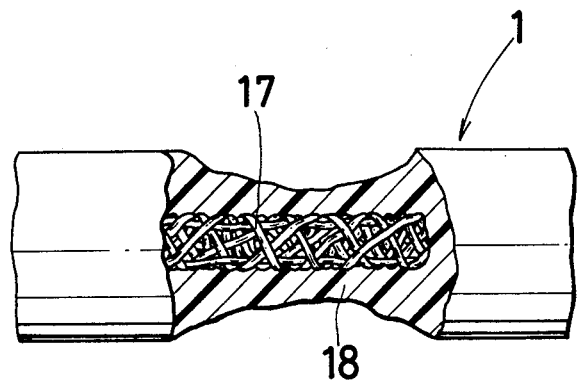
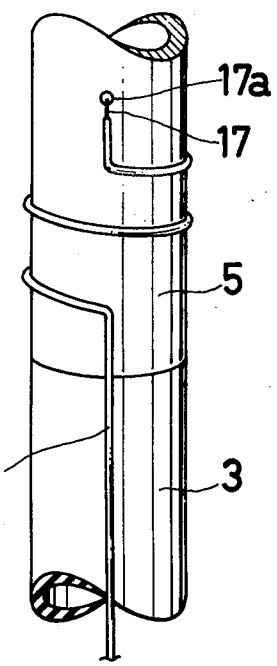
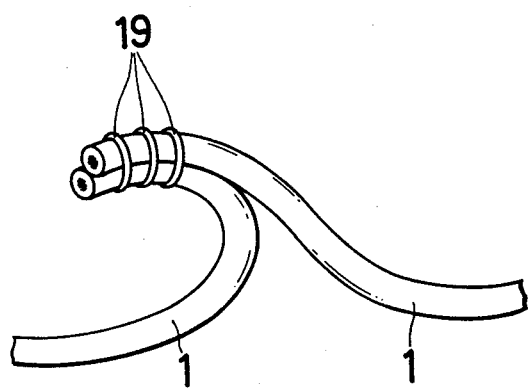

ARRANGEMENT FOR DETECTING THE LOCATION OF AN ELECTRICALLY INSULATIVE CONTINUOUS ITEM POSITIONED UNDERGROUND

BACKGROUND OF THE INVENTION

1. Field of the Invention

The present invention relates to an arrangement for detecting from the ground surface the location of an electrically insulative continuous or long length item located underground by the employment of electromagnetic waves.

Commonly, electrically conductive wires as described above are generally required for underground pipe lines made of synthetic resin intended to transport, for example, city gas or city water.

2. Description of the Prior Art

In one prior art arrangement, it is so arranged that a metallic wire is laid on the peripheral surface of an underground pipe made of synthetic resin, whereby the bare wire is subject to unavoidable corrosion.

Meanwhile, in another prior art arrangement, the electrically conductive wire is coated with an electrically insulative synthetic resin material for the prevention of corrosion of the wire underground. In the conventional arrangement as described above, however, if the electrically conductive wire should accidentally be broken or cut off by digging or excavation work in the ground, propagation of the electric current is completely interrupted, with consequent suspension of electromagnetic wave generation, thus making it utterly impossible to detect the location from the ground surface.

If the frequency of the electromagnetic wave is made extremely high, it may become possible to transmit the current from one cut end of the conductive wire to the other cut end thereof through the ground. However, in the case where the electromagnetic waves of such extremely high frequencies are to be employed, there is presented another problem that it becomes difficult to detect the conductive wire over a long distance from the point of power supply.

Moreover, for connecting the electrically conductive wires to each other, it is necessary to first remove the outer coating layers thereof for electrically connecting the core wires, while it is required further to cover the connected portions with putty or the like for protection against corrosion, and thus, a considerable amount of manual labor is required for such connection operation.

Meanwhile, in situations where steel pipes are connected to the synthetic resin pipes, it has been a general practice to connect the bare wire or the wire covered with the outer coating layer, which is provided along the synthetic resin pipe, to the steel pipe by soldering or welding, and therefore, the connecting operation is further complicated undesirably.

Accordingly, it is an essential object of the invention to provide an improved arrangement for detecting an underground continuous length item by solving the technical problems as described above, and also an electrically conductive wire for detection to be employed for such detecting method.

It is another important object of the invention to provide an electrically conductive wire for detecting an underground continuous length item of the above described type which has an electrical conductivity, and is free from undesirable corrosion.

SUMMARY OF THE INVENTION

To accomplish the foregoing objectives, there is provided an arrangement for detecting an underground continuous length item including an electrically conductive wire constituted by covering a flexible metallic core wire with an outer coating layer made of a flexible and electrically conductive high polymeric organic material. Such electrically conductive wire is positioned under the ground along the underground continuous length item. A high frequency current is supplied to the electrically conductive wire, and electromagnetic waves emitted therefrom are received for detecting the location of the underground continuous length item under the ground.

According to the invention, since electric current is propagated through the ground via the coating layer of the wire upon supply of high frequency power to the wire, it becomes possible to detect from the ground surface the location of the continuous length item positioned underground, even when the wire is cut.

According to another aspect of the invention, there is provided an electrically conductive wire for detecting an underground continuous length item which comprises a flexible metallic core wire, and an outer coating layer made of a flexible and electrically conductive high polymeric organic material applied onto the flexible metallic core wire. The electrically conductive wire outer coating layer is prepared by mixing carbon powder or metallic powder into synthetic resin or rubber, and has specific resistance in a range between approximately above 10 $\Omega$·cm and below 50,000 $\Omega$·cm, and preferably 100 $\Omega$·cm.

Since the coating layer is made of high polymeric organic material having electrical conductivity, there is no possibility that it disappears, for example due to rusting or the like while underground, and thus, the conductive wire may be used semi-permanently without losing its electrical conductivity. Moreover, due to the fact that the coating layer itself is also electrically conductive, even in the case where the conductive wire is accidentally cut, for example, by a digging operation, etc., it is possible for electric current to be propagated from the coating layer at one cut end of the conductive wire to the coating layer at the other cut end thereof through the ground, and therefore, electromagnetic waves are produced by the electric current, thus making it possible to detect the location from the ground surface. Furthermore, in the connection of the electrically conductive wires, since the coating layer thereof is electrically conductive, the conductive wires to be connected to each other have only to be brought into contact with each other, and direct connection between the core wires is not necessarily required, with such connection being consequently extremely facilitated. Additionally, the core wires and coating layers having flexibility may be disposed along the continuous length items laid under the ground, resulting in facilitation of the installation thereof. Moreover, for electrically connecting the conductive wire to the metallic pipes and the like, the conductive wire has only to be directed around the metallic pipe for causing the electric current to flow, with a marked simplification of the connecting operation.

BRIEF DESCRIPTION OF THE DRAWINGS

A detailed description of the invention will be made with reference to the accompanying drawings herein like numerals designate corresponding parts throughout the various figures, and wherein:

FIG. 4 is a side elevational view, partly broken away, showing the structure of the conductive wire according to one preferred embodiment of the present invention, FIG. 5 is a perspective view showing a manner of connection between two conductive wires, and FIG. 6 is a fragmentary side elevational view showing a manner of connection between a conductive wire and a steel pipe.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention since the scope of the invention best is defined by the appended claims.

Figure 1:
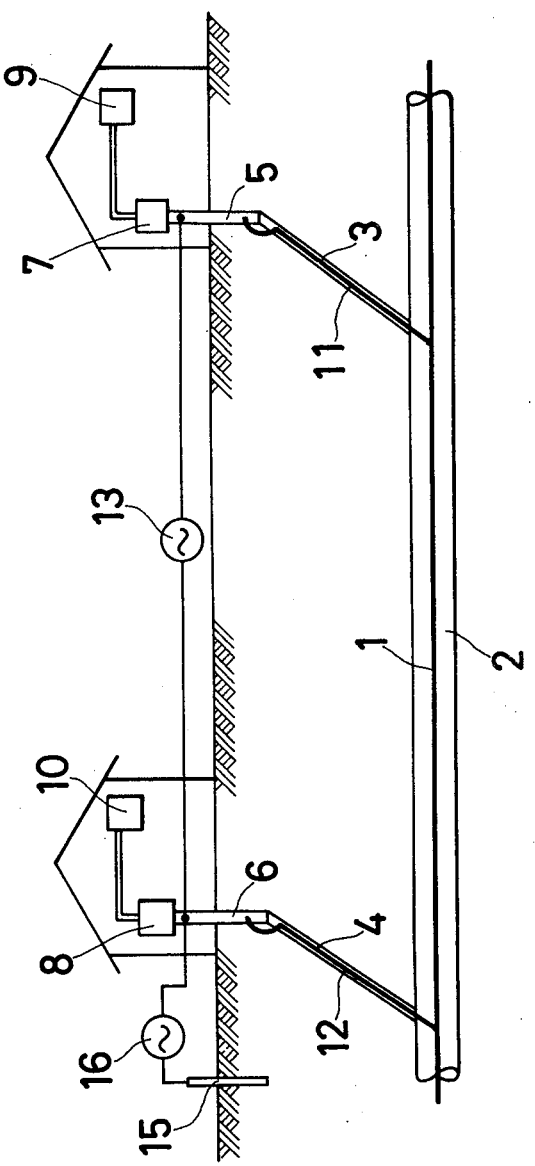
FIG. 1 is a schematic side sectional view explaining the principle for detecting the location of a pipe laid under the ground by the employment of an electrically conductive wire according to one preferred embodiment of the present invention.

Referring now to the drawings, there is shown in FIG. 1 a schematic side sectional view explanatory of the principle for detecting the location of a pipe 2, positioned under the ground in a non-dry state for transporting city gas therethrough, by the employment of an electrically conductive wire 1. To the pipe 2 made, for example, of synthetic resin such as polyethylene, there are connected branch pipes 3 and 4 composed of electrically insulating synthetic resin. The branch pipes 3 and 4 are further connected to steel pipes 5 and 6 which are coupled to gas burning appliances 9 and 10 through gas meters 7 and 8 so as to use the city gas, for example, at homes, etc. Along the pipe 2, there is provided the electrically conductive wire 1, which is connected to one end of each of electrically conductive wires 11 and 12 provided along the branch pipes 3 and 4. The conductive wires 11 and 12 have a construction similar to that of the conductive wire 1. The other ends of the conductive wires 11 and 12 are respectively connected to the steel pipes 5 and 6 in a manner as described in detail later with reference to FIG. 6.

For detecting from the ground surface the location of the pipe 2, output terminals of a high frequency power source 13 are connected across the steel pipes 5 and 6 as shown. The high frequency power source 13 derives electric power having frequencies, for example, in the range of 2 kHz to 100 kHz, with a voltage lower than approximately 60 V. By detecting at the ground surface electromagnetic waves radiated by the conductive wire 1, it is possible to determine the location of the pipe 2 under the ground extending along the conductive wire 1. The conductive wire 1 and the pipe 2 as described above are laid under the ground at a depth of, for example, 0.6 to 1.2 m below the ground surface.

Figure 2:
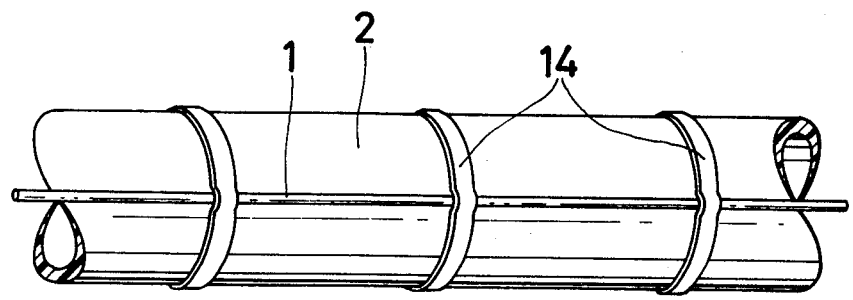
FIG. 2 is a fragmentary side elevational view showing, on an enlarged scale, the state where the conductive wire is provided on the pipe.

In FIG. 2, there is shown a manner of providing the electrically conductive wire 1 to extend along the pipe 2, according to one preferred embodiment of the present invention. In this embodiment, the conductive wire 1 is disposed, for example, on a straight line parallel to the axis of the pipe 2, while tapes 14 simultaneously surrounding the outer periphery of the pipe 2 and the conductive wire 1 fix the conductive wire 1 to the outer peripheral surface of pipe 2.

Figure 3:
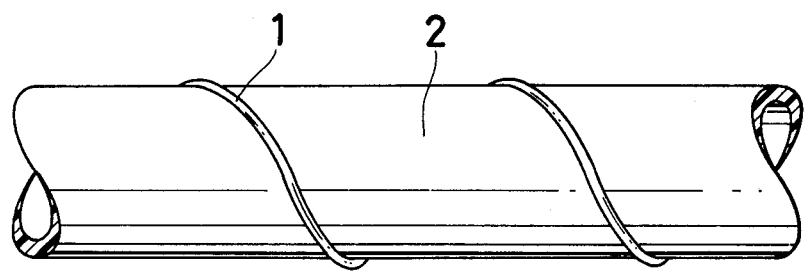
FIG. 3 is a view similar to FIG. 2, but particularly shows a modification thereof.

Referring to FIG. 3, there is illustrated a modification of the arrangement in FIG. 2, in which the conductive wire according to the present invention is also provided along the pipe 2. In this modification, the conductive wire 1 is helically or spirally directed around the outer periphery of the pipe 2. Thus, the tapes 14 described as employed in the arrangement of FIG. 2 may be dispensed with in the modification of FIG. 3.

Referring back to FIG. 1, for detecting the position of the conductive wire 1 and consequently that of the pipe 2 from the ground surface, there may be alternately employed another practice in which an electrode 15 is inserted into the ground, with electric power being supplied between electrode 15 and the steel pipe 6 or 5 from a high frequency power source 16.

Referring further to FIG. 4 showing the electrically conductive wire 1 according to one preferred embodiment of the present invention, with a portion thereof broken away for clarity, the conductive wire 1 is constructed by applying a coating layer 18 onto a metallic core wire 17. The core wire 17, made of a metallic material such as copper, iron, etc. which are good conductors of electric current, is formed by twisting or stranding together a plurality of single wires, and has flexibility. Meanwhile, the coating layer 18 is made of a high polymeric organic material also having flexibility and electrical conductivity. The coating layer 18 as described above may be composed of a material prepared by mixing carbon powder or metallic powder into a synthetic resin such as polyethylene, etc., synthetic rubber or natural rubber, and should have a specific resistance between approximately above 10 $\Omega$·cm and approximately below 50,000 $\Omega$·cm, preferably 100 $\Omega$·cm. The coating layer 18 having a specific resistance in the region described above may be achieved by mixing 50 to 60 parts by weight of acetylene carbon with 100 parts by weight of chloroprene rubber or natural rubber, etc. In the case where the specific resistance of the coating layer 18 is less than about 10 $\Omega$·cm, the mixing rate of the carbon powder or metallic powder becomes too large as compared with the amount of the synthetic resin or rubber, resulting in inferior flexibility, and thus, it becomes difficult to manufacture the electrically conductive wire 1 of the present invention. Meanwhile, in the case where the specific resistance of the coating layer 18 described above exceeds about 50,000 $\Omega$·cm, with consequent higher insulation, it becomes completely impossible to effect detection, if the conductive wire 1 is cut off as stated earlier with reference to the prior art.

In FIG. 5 showing a manner of connection of two conductive wires 1, the ends of the conductive wires 1 to be connected are piled one upon another in parallel relation to each other as shown, and are tied together by strings 19 made of an electrically conductive or electrically insulative material. In the manner described above, the coating layers 18 are electrically connected to each other, and even without any direct connection between the core wires 17, the conductive wires 1 may be brought into a condition where they are electrically connected.

Referring also to FIG. 6 illustrating a manner of connection between the conductive wire 11 provided on the branch pipe 3 and the steel pipe 5, the conductive wire 11 having a construction similar to the conductive wire 1 as described earlier is wound around the steel pipe 5, by which arrangement electric current may be caused to flow through the conductive wire 11 and the steel pipe 5. Accordingly, the work required for connection between the conductive wire 11 and steel pipe 5 is extremely simplified. Similar procedures as described above may be applied to the connection between the conductive wire 12 provided along the branch pipe 4 and the steel pipe 6. An end 17a of the core wire 17 may have the coating layer 18 removed therefrom and be connected by soldering or welding to the steel pipe 5.

It should be noted here that, although not particularly shown, in a further modification according to the invention, the wire 17 may be formed by a single wire having flexibility. It should also be noted that, the concept of the invention is not limited in its application to the pipe 2 and branch pipes 3 and 4 as described in the foregoing embodiments alone, but may widely be applied to various other continuous length items positioned underground.

EXAMPLE

In FIG. 1, the conductive wire 1 according to the invention shown in FIG. 4 and the pipe 2 are positioned approximately 1.2 m beneath the ground surface. The power source 13 provides device electric power at 2 KHz and 6 Volts. The present inventors have ascertained that the location of the pipe 2 is detected at the ground surface along 100 to 200 m between the pipes 3 and 4 in the case where the wire 1 is continuous. The inventors also have ascertained that the location of the pipe 2 is detected at the ground surface along 40 to 100 m between the pipes 3 and 4 in the case where the ground is in the range of the specific resistance of from 1,000 Ω·cm to 5,000 Ω·cm, and a portion of approximately 0.5 to 1.0 m of the wire 1 is cut off.

On the other hand, when a conventional electrically conductive wire coated with an electrically insulative synthetic resin material is employed in place of the wire 1, it is impossible to detect the pipe 2 in the case where a portion of 0.5~1.0 m of the conventional wire is cut off.

What is claimed is:

1. An arrangement for detecting above the ground the location of a generally horizontally arranged gas conveying passage positioned beneath the ground, said arrangement comprising:
    a gas pipe positioned beneath the ground and defining a generally horizontal gas conveying passage, said gas pipe being formed of an electrically insulative synthetic resin material;
    an electrically conductive wire positioned along the exterior of said gas pipe, said wire comprising a flexible metallic core formed by stranding together a plurality of single wires, and an electrically conductive flexible outer coating layer applied directly over said core, said layer being formed of a combination of 100 parts by weight of chloroprene rubber or natural rubber per 50 to 60 parts by weight of acetylene carbon, and said layer having a specific resistance of approximately 100 ohm-cm;
    a steel pipe extending into the ground;
    a branch gas pipe extending from said gas pipe to said steel pipe and positioned beneath the ground, said branch gas pipe being formed of an electrically insulative synthetic resin material;
    an electrically conductive branch wire extending along the exterior of said branch gas pipe, said branch wire comprising a flexible metallic core formed by stranding together a plurality of single wires, and an electrically conductive flexible outer coating layer applied directly over said core, said layer being formed of a combination of 100 parts by weight of chloroprene rubber or natural rubber per 50 to 60 parts by weight of acetylene carbon, and said layer having a specific resistance of approximately 100 ohm-cm, said branch wire having a first end electrically connected to said wire and a second end wound around the exterior of said steel pipe, an end of said core of said second end of said branch wire being welded to the exterior of said steel pipe; and
    high frequency power source means, electrically connected to said steel pipe at a position above ground, for supplying to said steel pipe, said branch wire and said wire high frequency energy of from 2 KHz to 100 KHz at 6 volts, such that said branch wire and said wire emit electromagnetic waves which are detectable above ground.

2. An arrangement as claimed in claim 1, wherein said first end of said branch wire is in parallel layer-to-layer abutment with said wire without direct core-to-core contact therebetween.

* * * * *